J. D. VAN HOEVENBERGH.
Carriage-Spring.
No. 60,093. Patented Nov. 27, 1866.
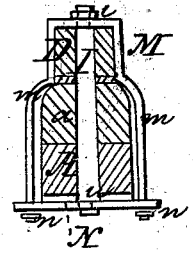
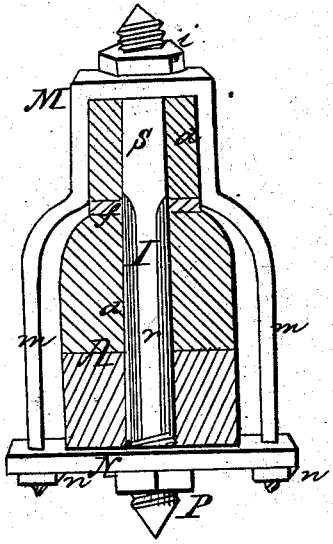
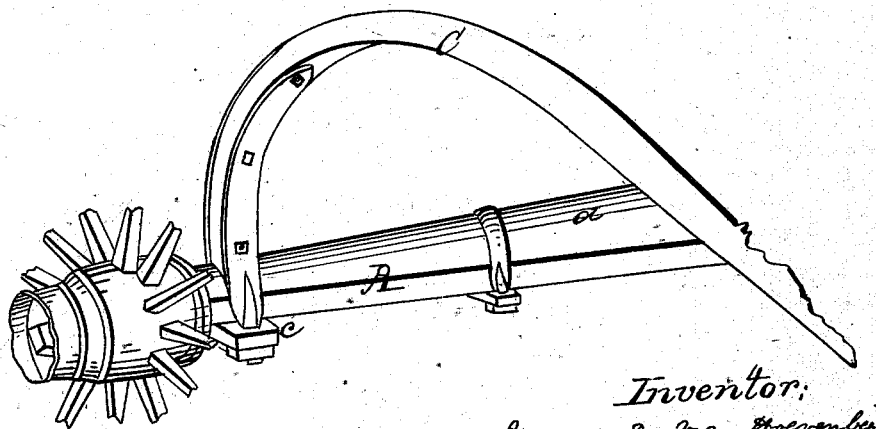
Witnesses:
Thomas T. Parker
R. D. O. Smith
Inventor:
James D. Van Hoevenbergh.
By his atty
J. S. Brown

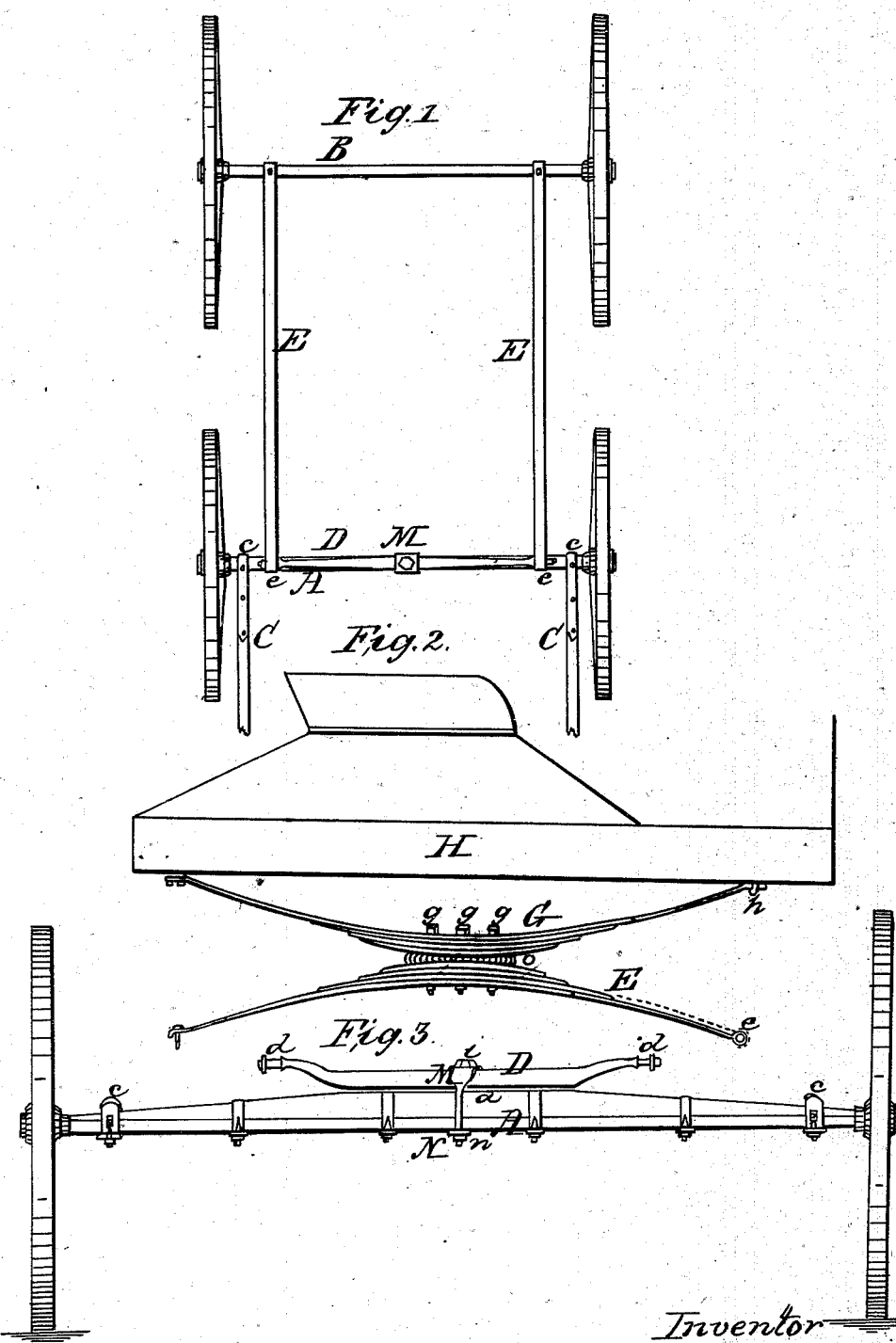

UNITED STATES PATENT OFFICE.

JAMES D. VAN HOEVENBERGH, OF KINGSTON, NEW YORK.

IMPROVEMENT IN CARRIAGES.

Specification forming part of Letters Patent No. 60,093, dated November 27, 1866.

*To all whom it may concern:*

Be it known that I, JAMES D. VAN HOEVENBERGH, of Kingston, in the county of Ulster and State of New York, have invented certain Improvements in Carriages; and I do hereby declare that the following is a full and exact description thereof, reference being had to the accompanying drawings, making part of this specification—

Figure 1 being a top view of the running-gear of a light wagon constructed with and illustrating my improvements; Fig. 2, a side view of the springs and body of the wagon; Fig. 3, a front view of the forward wheels and axle, showing also my improved king-bolt and "third axle;" Fig. 4, a cross-section of the forward and third axles, close to the king-bolt and its yoke, showing the construction thereof; Fig. 5, a view in perspective, showing the rigid attachment of the thills to the forward axle; Fig. 6, a view showing a modification of the construction of the king-bolt.

Like letters designate corresponding parts in all of the figures.

My improvements consist, first, in the swivel-gear of the forward part of the carriage, in which the fifth-wheel arrangement is dispensed with, and a rigid attachment of the thills to the forward axle is allowed; second, in the construction and arrangement of side springs, wherein not only the elasticity and ease of their action are enhanced, but increased security against accident, in doing away with reaches and connecting-braces, is gained.

In carrying out my improvements I employ a third axle, D, to rest directly upon the forward axle, A, and connect it with said axle by a king-bolt, I, of improved construction, and use a guard-yoke, M, in connection therewith. I also connect my side springs, E E, with the third axle, D, by wrists *d d* at the ends of the said third axle, and sleeves or eyes *e e* at the ends of the springs, to clasp the said wrists, and thereby enable the axles to turn forward and backward under the carriage-body to any required extent, so as to allow the use of the rigid attachment of the thills to the forward axle. This third axle rests on the forward axle, A, or its wooden stock *a*. It is made entirely of iron, and may bend upward at the ends as much as desired.

The king-bolt I is square or angular in the portion *s*, which extends through the third axle; and that portion is a little tapering upward, as seen in Fig. 4, so that by turning the nut *i*, which secures its upper end, it can be tightened in its socket, if it ever wears loose, and thus prevent all rattling.

The portion *r*, which extends through the forward axle A, is round, and furnishes the pivot on which the forward axle and wheels turn. In connection with this king-bolt a yoke, M, is used. It embraces the two axles, substantially as shown, the upper part closely clasping and firmly securing the third axle, D, while the lower parts or legs, *m m*, are spread outward, so as to allow a sufficient turning movement of the axle A therein to turn the carriage.

A cross-bar, N, passes over the extremities of the legs *m m*, bearing upward against shoulders thereof, and held by nuts *n n*.

The king-bolt extends centrally through the yoke M and its cross-bar N, the nut *i* securing them together at the upper end; and a nut, *p*, may be used at the lower end of the bolt, or may be dispensed with.

A modification of the construction of the king-bolt is shown in Fig. 6, consisting of a shoulder, *u*, at the lower end, where it bears on the cross-bar N of the yoke M. There may also be a little space between the cross-bar and the lower side of the axle A, as shown, thereby allowing a perfectly free turning movement of the axle, and helping to brace and support the king-bolt. This construction of the king-bolt and employment of the yoke M in connection therewith insure perfect safety against any disengagement of the forward wheels from the carriage, since if the king-bolt should break, the yoke would hold the axle A and sustain the carriage-body for the time being. This construction also obviates all rattle in this part of the running-gear of the carriage.

The thills C C are attached rigidly to the forward axle, A, by clips or other secure fastening, as at *c c*. By this rigid attachment no rattling or noise can be produced, which is so disagreeable with the hinged-thill carriages.

Each spring of the carriage is composed of a side half-elliptic spring, E, which connects the hind axle, B, with the third axle, D, and takes the place of a reach of a half-elliptic spring, G, attached to the carriage-body H, and of a cushion-spring, o, of india-rubber, between the two parts E and G, substantially as shown in Fig. 2.

The springs E and G are placed back to back, or their convex parts toward each other, as shown, and the spring-cushion o between them forms their union in connection with bolts g g g, which unite all together.

The lower leaf of each spring E forms the reach proper between the axles, and should be sufficiently strong for the purpose. The other leaves rest simply on this; but the second leaf may extend forward and rest on, or even partially clasp, the wrist d of the third axle, as indicated by the red line at x, Fig. 2. This will increase the security against accident from breakage. This second leaf might also extend back over the hind axle, if desired.

The front ends of the springs G G have a free attachment, as at h, Fig. 2, so as to allow the springs to lengthen or shorten in action.

The wrist and sleeve, or equivalent hinge-connection between the forward ends of the side springs and third axle, to give the turning movement described, are not necessarily dependent on the peculiar construction of the springs herein described, but are also applicable to other constructions of side springs. Two or more springs may be employed on each side, instead of one, as specified.

What I claim as my invention, and desire to secure by Letters Patent, is—

1. The wrist and sleeve, or equivalent hinge-connection between the side springs and the third axle, substantially as and for the purpose herein specified.

2. I also claim the yoke M and king-bolt I, constructed and arranged substantially as described, to connect the forward axle, A, and third axle, D, for the purpose herein set forth.

3. I also claim the construction of the springs, each composed essentially of the half-springs E and G, with the india-rubber spring-cushion o between them, substantially as herein specified.

JA. D. VAN HOEVENBERGH.

Witnesses:
J. S. BROWN,
THOMAS T. PARKER.